United States Patent

Zabiak

[15] 3,687,887

[45] Aug. 29, 1972

[54] PHOTOGRAPHIC FILM TITLING INK

[72] Inventor: Daniel M. Zabiak, River Grove, Ill. 60171

[73] Assignee: A. B. Dick Company, Niles, Ill.

[22] Filed: July 20, 1970

[21] Appl. No.: 56,708

[52] U.S. Cl. ........260/29.6 WB, 260/29.6 E, 346/140
[51] Int. Cl. .......C08f 29/42, C08f 41/02, C08f 41/12
[58] Field of Search.....260/29.6 E, 29.6 WB; 206/20

[56] References Cited

UNITED STATES PATENTS

| | | | |
|---|---|---|---|
| 2,316,629 | 4/1943 | Schmitz | 260/32 |
| 3,053,779 | 9/1962 | O'Neill | 260/17.5 |
| 3,349,055 | 10/1967 | Taguchi | 260/29.6 |

*Primary Examiner*—Melvin Goldstein
*Attorney*—McDougall, Hersh & Scott

[57] ABSTRACT

A jet printing ink composition having application onto a film base, as in the titling of film or photographic negatives with alphanumeric or other characters in which the ink composition is an aqueous system containing 1–5 percent by weight of a dissolved styrene-maleic anhydride resin, 3–20 percent by weight of glycol ethers and up to 4 percent by weight carbon black in suspension or 1–4 percent orthochromatic dyes in solution, or both, plus additives such as tinting dyes.

9 Claims, No Drawings

PHOTOGRAPHIC FILM TITLING INK

This invention relates to an ink composition for jet printing onto a film base and its relates more particularly to an ink composition which can be applied by jet printing means in alphanumeric characters onto a film base, such as a photographic negative, for purposes of titling and the like.

Current techniques for automatic titling frames of camera film include ink compositions applied by impact of the type which tends to produce deformations in the film or by an electrostatic method wherein the image is developed with a dry toner that produces a negative having dirt or scratches on the surface. These difficulties can be overcome by the use of an ink composition which can be applied without contact, such as by the use of the ink jet principle employed in various printing operations. Current jet inks containing black or blue-black dyes have been found to be insufficient for titling photographic negatives by reason of their transparency to the 360-560 nanometer spectral sensitivity of the photographic print paper.

Thus it is an object of this invention to produce and to provide a method for producing a new and improved jet printing ink which can be printed onto a film base, which can be jet printed in alphanumeric characters to a photographic film, which contains sufficient blue and black color to be visible under dark room safe light, which has good adhesion to gelatin or plastic film base materials, which can be used as a titling ink for clean and non-contact application, which does not raise problems of dusting or scratching which is characteristic of electrostatic image development, which does not cause deformation of the base upon application, which dries relatively fast, or in which the drying can be accelerated by infra red or microwave drying without distortion of the base film, which produces images resistant to freons, alcohols and hydrocarbon solvents to enable film cleaning without image deterioration or damage, which is non-toxic, non-flammable and safe to use, and in which the ink composition remains stable in storage over an extended period of time.

The following example of a general formulation for an ink composition embodying the features of this invention is given by way of illustration, and not by way of limitation:

EXAMPLE 1

1-5 percent by dry weight resinous binder
3-20 percent by weight glycol ethers
0-4 percent by dry weight Aquablack
1-4 percent by weight orthochromatic dye
1-4 percent by weight tinting dyes
Balance water, plus other possible minor additives As the resinous binder, it is preferred to make use of styrene-maleic anhydride copolymer type resins, as represented by SMA 1725, SMA 17352-A, or SMA 2625 resins manufactured by Arco Chemical Co. Such resins are provided in the form of a dry anhydride which should be hydrolyzed or otherwise solubilized as by formulating the dry anhydride into a solution corresponding to the following:

15 percent by weight SMA 2625
4.2 percent by weight 28 percent ammonium hydroxide solution
80.8 percent by weight water The above solution is used in an amount calculated to give the dry weight of resin in the above formulation of Example 1. Instead of a styrene-maleic anhydride resin, use can be made of other water soluble resinous components, such as carboxylated polyvinyl acetate, such as Gelva C5V16 water soluble type.

The resinous component serves in the formulation not only to fix the ink image to the film base but it seems to operate uniquely, in the described combination, to keep the carbon particles suspended in the ink composition as well as to enhance dye intensity. The amount of resinous component, when calculated on the dry weight basis of the ink composition, can vary within the range of 1-5 percent by weight but it is preferred, because of viscosity considerations, to make use of an amount within the range of 1-3 percent by weight. The resinous component can be extended by as much as 100 percent by the combination with other resinous materials such as the polyacrylic resin solution "Joncryl 60" or any other water soluble resin compatible with the styrene-maleic anhydride resins.

The glycol ethers represent an important component of the ink composition. In the absence of the glycol ethers, the ink image will tend to flake off of the film base. The glycol ethers also function in the manner of a humectant which is effective to militate against drying of the ink in the jet orifice during normal down time thereby to avoid the difficulties encountered by plugging the orifice. The glycol ethers can be represented by the cellosolve and carbitol compounds, as represented by ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, propylene glycol methyl ether, dipropylene glycol methyl ether, tripropylene glycol methyl ether, ethoxy triglycol and methoxy triglycol. The glycol ethers or polyols can be employed in an amount within the range of 3-20 percent by weight of the ink composition and preferably in an amount within the range of 8-15 percent. Representative of suitable polyols are ethylene glycol, diethylene glycol, propylene glycol, dipropylene glycol, tripropylene glycol, triethylene glycol, hexylene glycol, glycerol and lower polyethylene glycols.

As the tinctorial agent, use can be made of a carbon black dispersion in amounts up to 4 percent by weight of the composition, calculated on the dry basis weight of the carbon black, or a water solution of orthochromatic dyes in an amount within the range of 1-4 percent by weight, but it is preferred to make use of both a carbon black dispersion and a solution of orthochromatic dyes in the amounts described.

As the carbon black dispersion, use has been made of Aquablack (trademark of Columbia Carbon Company). Aquablack or other carbon blacks, when used, are limited to a total amount not over 4 percent by weight of the ink composition since there is a tendency to plug the jets and undesirably to increase the viscosity of the ink composition when present in large amounts.

The orthochromatic dyes, which function as opacifiers in the described ink compositions, can be represented by Acid Yellow 23, Acid Yellow 36, Acid Red 73, and the like. Use can be made of a combination of Acid Yellow dyes with Acid Red dyes, without the need for carbon black, since the combination is sufficiently opaque in the 360-560 nanometer spectral sensitivity of most print papers. The combination, however, gives a yellow-orange image that is practically invisible in the dark room red safe light so that addition of Direct Black 38 or Acid Black 1 is preferably made to tint the orange color back to a readable black under a safe light. The dye components can be employed in various combinations, as will hereinafter be illustrated, but in a total amount which does not exceed 8 percent by weight and preferably within the range of 2-4 percent by weight of the ink composition.

The following examples are given by way of further illustration with respect to specific formulations of ink compositions representing the practice of this invention, in which the amounts are specified in per cent by dry weight:

EXAMPLE 2

1 percent SMA 2625 (styrene-maleic anhydride resin)
1 percent Acrylic Resin (Joncryl 60 of S. C. Johnson & Sons, Inc.) (5 percent of 20 percent solution)
8 percent Methyl carbitol
4 percent Butyl carbitol
2 percent Direct Black 38
0.5 percent Acid Black 1
0.75 percent Acid Yellow 36
0.75 percent Acid Red 73
0.1 percent Dioxin
0.5 percent Morpholine
1.0 percent Methyl pyrrolidone
Remainder water

EXAMPLE 3

1 percent SMA 1725
1 percent Acrylic Resin (CDx67-3 – S. C. Johnson & Sons, Inc.)
8 percent Methyl carbitol
4 percent Butyl carbitol
2 percent Direct Black 38
0.5 Acid Black 1
0.75 percent Acid Yellow 23
0.75 percent Acid Red 73
0.1 percent Dioxin
0.5 percent Morpholine
1.0 percent Methyl pyrrolidone
Remainder water

EXAMPLE 4

1 percent Gelva C5V16
8 percent Methyl carbitol
4 percent Butyl carbitol
0.5 percent Aquablack 55
2 percent Direct Black
0.5 percent Acid Black 1
075 percent Acid Yellow
0.75 percent Acid Red 73
Remainder water In preparing the ink composition, the resin is formulated into a water solution, as in the manner previously described. The remainder of the ingredients are added and the ink composition is mixed thoroughly, for example, by stirring, and then filtered to remove solids, as through a 1.2 micron RA Millipore filter, to remove all insolubles that might otherwise plug the jets.

The ink compositions of Examples 2-4 are characterized by a viscosity of about 2 cp at 25° C., a specific resistivity within the range of 100-150 ohm-cm, and a surface tension value within the range of 35-40 dyne-cm. For best results, it is desirable to formulate the ink composition for a viscosity of about 1-4 cp at 25° C. and a specific resistivity of less than 5,000 ohm-cm.

When jet printed to photographic negatives, the inks of Examples 2-4 produce images having optical densities of 1.35 or more. Higher optical densities can be obtained by the use of higher dye or pigment loading, if desired. The ink composition of this invention finds excellent use in jet printing for film titling and identification of frames of photographic negatives. The ink composition can be applied by jet printing apparatus in alphanumeric characters to identify each frame in a specific row. In addition, the ink composition is sufficiently opaque to a photographic printing light so that the image would appear white on a dark background on the print paper.

Thus the ink composition of this invention can be used effectively on a film base, such as triacetate film, films of polyester resins, films of acetate butyrate resins, and films of polycarbonate resins, or it can be applied most effectively to the coated side of the photographic negative, such as the side coated with gelatin or other hydrophilic colloid.

The dioxin, morpholine, methyl pyrrolidone and the tinting dyes are not essential components of the ink compositions of this invention but merely represent additives employed to improve the shelf life, stability and/or color of the ink composition.

It will be understood that changes may be made in the details of formulation and operation without departing from the spirit of the invention, especially as defined in the following claims.

I claim:
1. An ink composition for application onto a film or colloid base layer consisting essentially of an aqueous composition containing 1-5 percent by weight of a dissolved organic resinous binder selected from the group consisting of a water soluble styrene-maleic anhydride resin and a water soluble carboxylated polyvinyl acetate resin, 3-20 percent of at least one soluble glycol ether, and a coloring component selected from the group consisting of up to 4 percent by weight carbon black in suspension, 1-4 percent by weight of at least one orthochromatic dye, and mixtures thereof.

2. An ink composition as claimed in claim 1 in which the organic resinous binder is present in an amount within the range of 2-4 percent by weight of the ink composition.

3. An ink composition as claimed in claim 1 in which the resinous binder is a styrene-maleic anhydride resin.

4. An ink composition as claimed in claim 1 in which the resinous binder is a water soluble carboxylated polyvinyl acetate.

5. An ink composition as claimed in claim 2 in which the resinous binder is extended with up to an equal amount of an acrylic acid resin.

6. An ink composition as claimed in claim 1 in which the glycol ethers are present in an amount within the range of 8-20 percent by weight of the ink composition.

7. An ink composition as claimed in claim 1 which contains not more than 4 percent by weight of carbon black and from 1–4 percent by weight of orthochromatic dyes.

8. An ink composition as claimed in claim 7 in which the dyes are present in an amount within the range of 2–8 percent by weight.

9. An ink composition as claimed in claim 1 which includes a minor additive selected of the group consisting of dioxin, methyl pyrrolidone, morpholine and tinting dyes.

* * * * *

UNITED STATES PATENT OFFICE
CERTIFICATE OF CORRECTION

Patent No. 3,687,887                    Dated August 29, 1972

Inventor(s) Daniel M. Zabiak

It is certified that error appears in the above-identified patent and that said Letters Patent are hereby corrected as shown below:

column 3, line 60, after "Yellow" insert --- 36 ---

Signed and sealed this 30th day of January 1973.

(SEAL)
Attest:

EDWARD M. FLETCHER, JR.                 ROBERT GOTTSCHALK
Attesting Officer                       Commissioner of Patents